Feb. 24, 1942.   T. E. M. HUTH   2,274,478
APPARATUS FOR MANUFACTURING FROZEN CONFECTIONS
Filed July 10, 1941   3 Sheets-Sheet 1

INVENTOR
Thelma Evelyn Mary Huth
BY Richard Newling
ATTORNEY

Feb. 24, 1942. T. E. M. HUTH 2,274,478
APPARATUS FOR MANUFACTURING FROZEN CONFECTIONS
Filed July 10, 1941 3 Sheets-Sheet 2

INVENTOR
Thelma Evelyn Mary Huth
BY
ATTORNEY

Feb. 24, 1942.                T. E. M. HUTH                2,274,476
           APPARATUS FOR MANUFACTURING FROZEN CONFECTIONS
                     Filed July 10, 1941         3 Sheets-Sheet 3
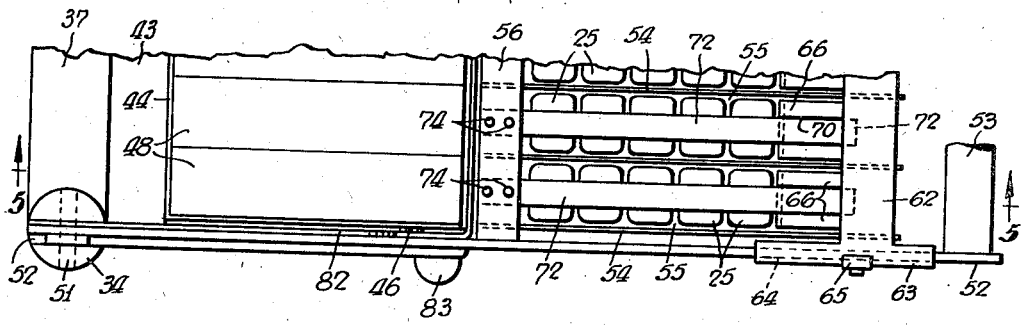
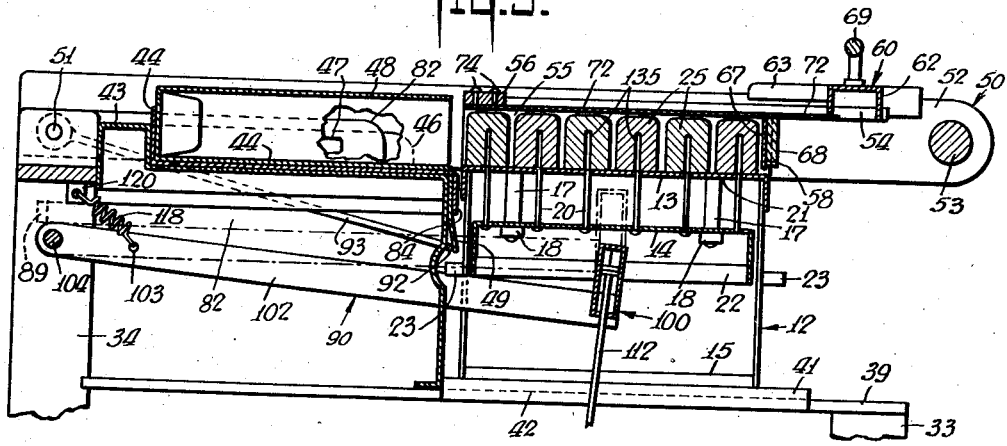
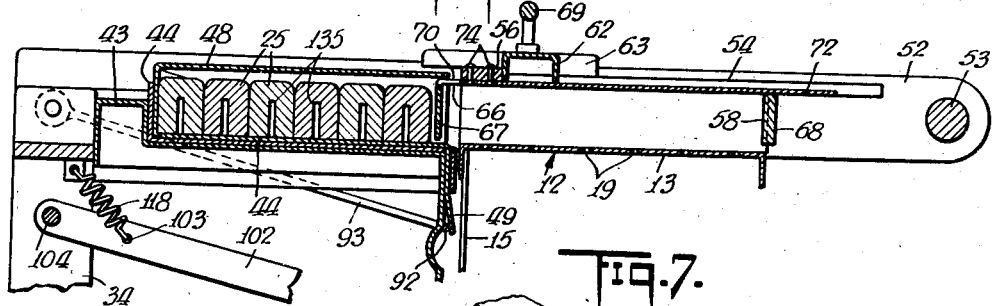
INVENTOR
Thelma Evelyn Mary Huth
BY Richard J. Newling
ATTORNEY Patented Feb. 24, 1942

2,274,478

UNITED STATES PATENT OFFICE 2,274,478

APPARATUS FOR MANUFACTURING FROZEN CONFECTIONS

Thelma Evelyn Mary Huth, Los Angeles, Calif., assignor to Joe Lowe Corporation, New York, N. Y., a corporation of Delaware Application July 10, 1941, Serial No. 401,772

3 Claims. (Cl. 107—45)

The present invention relates to improvements in apparatus for harvesting and packaging a plurality of frozen confectionery products of the type simulating the well-known candy "bon bon," and it relates specifically to the packaging of a plurality of such products simultaneously into a plurality of boxes in an efficient and sanitary manner.

Reference is made to the co-pending application of Norman M. Thomas, Serial No. 367,141, filed November 25, 1940, entitled "Method of an apparatus for manufacturing confectionery products" for a full and complete understanding of the basic problems and principles of operation of the apparatus shown herein.

An object of the present invention is to provide a simple, inexpensive and sanitary means for preventing the finished confectionery products from getting out of alignment when their respective spurs are suddenly withdrawn therefrom in a careless and violent manner, preparatory to their delivery into their respective packages.

Other and further objects and advantages of the invention, which result in simplicity, economy and efficiency, will be apparent from the following detailed description, wherein a preferred form of embodiment of the invention is shown, reference being had for illustrative purposes to the accompanying drawings, forming a part hereof in which:

Fig. 4 is a fragmentary plan view on an enlarged scale of that portion of the apparatus shown in Fig. 3, illustrating the manner in which my invention is embodied in the apparatus;

Fig. 5 is an enlarged fragmentary sectional view of the mechanism employed in releasing the confectionery products from their respective spurs, the same having been taken substantially along the line 5—5 of Fig. 4, looking in the direction of the arrows;

Fig. 6 is another enlarged fragmentary sectional view similar to Fig. 5, but showing the finished confectionery products after they have been moved by the apparatus from their positions on the spur plate into their respective packaging boxes; and Fig. 7 is an enlarged fragmentary perspective view of the pusher fingers of the apparatus.

Figure 2:
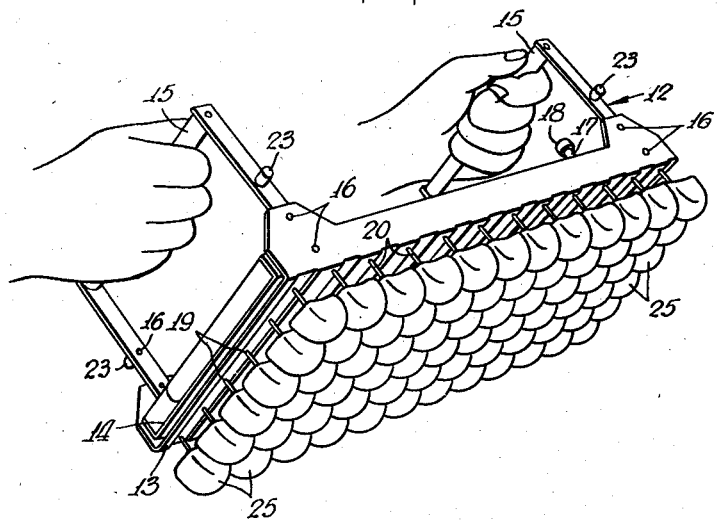
Fig. 2 is a perspective view of a conventional spur plate apparatus, having a combined stripper plate built therein, and illustrating a plurality of individual confectionery bodies separately bonded to its depending spurs, which device is utilized in manipulating and harvesting the confectionery products during their various manufacturing operations.
Figure 3:
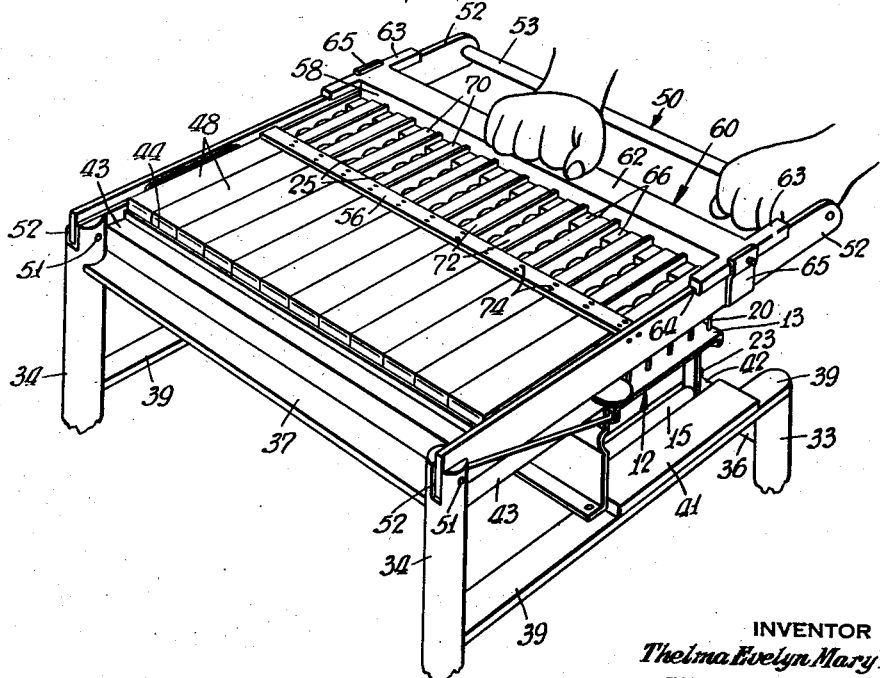
Fig. 3 is another perspective view of the packaging platform of the apparatus shown in Fig. 1, and illustrating the step of actually moving the rows of confectionery products from the spur plate to their respectively aligned and juxtaposed boxes.

Referring now to the drawings, wherein like numerals indicate like parts, there is shown in Fig. 2 a conventional portable spur plate or carrier 12, comprising a pair of superimposed slidably mounted marginal plates 13 and 14. The lower plate 13 having a plurality of transversely extending handles 15 fixedly secured thereto in any suitable manner as by spot-welding, riveting, etc., as indicated at 16. A pair of oppositely disposed upstanding arms 17, having enlarged heads 18, are mounted adjacent each end of the lower plate 13, which serve as stops for limiting the distance of separation between the plates 13 and 14. The lower plate 13 has a plurality of spaced apertures 19 arranged in rows transversely and longitudinally. The upper plate 14 is provided with a plurality of depending spurs 20, which are similarly spaced to correspond with the apertures 19 of the lower plate 13, and are adapted to extend therethrough when said plates are superimposed. Apertures 21 are also provided in the upper plate 14 for permitting the arms 17 to pass therethrough. The upper plate 14 is likewise provided with a pair of transversely extending handles 22. It will be noted that the handles 15 and 22 of the plates 13 and 14, respectively, are positioned adjacent each other so that both may be grasped by one hand for manual operation if desired. Suspending stops in the form of studs 23 are provided intermediate the uprights of the handles 15 for suspending the carrier 12 over the upstanding sidewalls of a conventional mold structure (not shown). In the illustration shown, it will be noted that a frozen confectionery product 25 is bonded to the lower ends of each spur 20. These confectionery products 25 are now ready for removal from their respective spurs and packaging or boxing.

Figure 1:
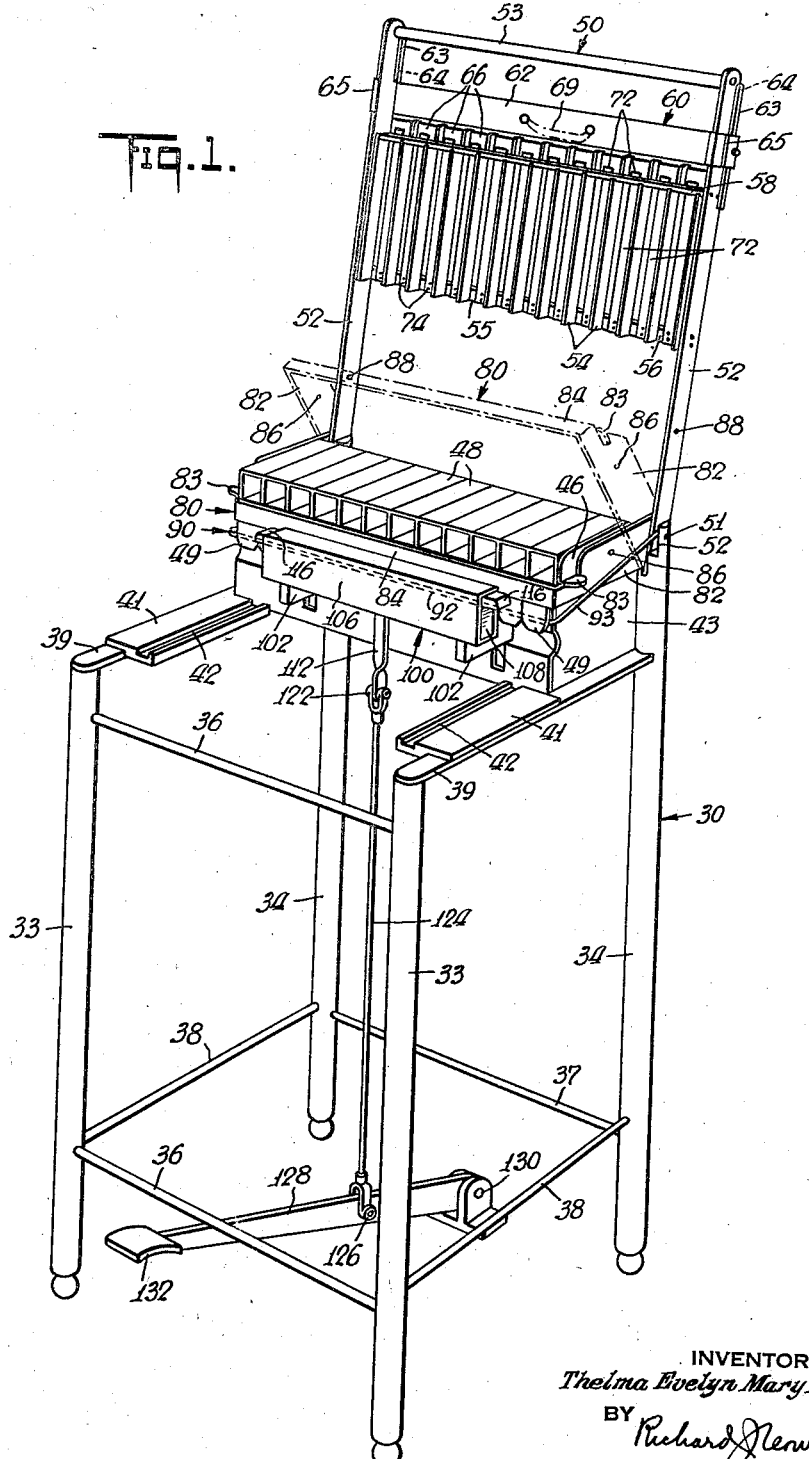
Fig. 1 is a perspective view of apparatus constructed in accordance with the invention for packaging simultaneously a plurality of individual confectionery products into a series of aligned open-ended boxes.

Referring now to Fig. 1 of the drawings, there is shown a harvesting and packaging apparatus 30 embodying my invention. The apparatus 30 consists of a plurality of front supporting legs 33, and a plurality of rear supporting legs 34, the latter extending upwards a short distance beyond the tops of the front legs 33. The front legs 33 are suitably braced transversely by cross-rods 36, and the rear legs 34 are similarly braced by cross-rods 37. The front legs 33 and rear legs 34 are suitably connected by lower cross-rods 38 and upper cross bars 39. Tracks 41 are mounted on top of the cross bars 39 adjacent the front end thereof, having a channel 42 for receiving and supporting the handles 15 of the spur plate 12. Mounted transversely of the back of the apparatus 30 is an elevated depressed platform 43, which is adapted to act as a supporting means for receiving a removable box holding tray 44, having upstanding side flanges 46, the latter having slots 47 therein to provide hand holes for facilitating gripping. The tray 44, in the illustration shown, is of a size adapted to receive a series of twelve open-ended conventional boxes 48, having end closure flaps 49, said boxes being aligned in a side by side horizontal arrangement, being one box for each transverse row of spurs 20 on the portable carrier 12.

A frame structure 50 is suitably mounted pivotally on a shaft 51 mounted transversely of slot 52 cut into the tops of the back legs 34. The frame structure 50, having side arms 52 connected at their front ends by a cross-rod 53, has intermediate its ends a guiding means in the form of a series of transversely spaced longitudinally extending guide members 54, forming troughs or passageways 55. The guide members 54 are fixedly suspended from cross-bars 56 and 58 secured to the tops of the side arms 52.

A slidable member 60 is mounted transversely of the frame structure 50 on its side arms 52. The slidable member 60 consists of a channel-shaped cross-bar 62, having side runners 63 provided with channels 64 adapted to receive the top surface of the side arms 52. A clamping member 65 secures the runners 63 to the guide rails or side arms 52. A plurality of spaced integrally formed pusher fingers 66 are mounted across the front side of the cross-bar 62, each finger being adapted to fill the trough or passageway 55 between adjacent guide members 54. The front edge of each pusher finger 66 is turned downwardly, as indicated at 67, to provide a relatively flat surface for engagement with the nearest confectionery product 25 of each row. A stop bar 68 is provided for limiting the forward movement of the slidable member 60 on its guide rails 52. A manipulating handle 69 is mounted centrally of the top of the cross-bars 62.

Each of the pusher fingers 66 has its top side cut out, as indicated at 70, to form slots.

The rear cross-bar 56 of the slidable member 60 has a series of spaced flexible metal strip members 72 welded or riveted thereto, as indicated at 74. These strips 72 are so spaced transversely of the apparatus along the underside of the cross-bar 56 as to provide for one extending centrally along each passageway 55, which passageways 55 are defined by the guide members 54. The opposite ends of the strips 72 extend freely through the slots 70 and beyond the front cross-bar 68. The length of each of the strips 72 is sufficient to prevent their being withdrawn through the slots 70 when the slidable member 60 is in its extreme forward position, as best shown in Fig. 5, in which position the fingers 66 are ready to move the rows of confectionery products 25 into their respective boxes 48.

A second pivotal frame member 80 is mounted on the shaft 51 of the rear uprights 34 to provide means for holding down the open end flaps 49 of the boxes 48. The frame member 80 has a pair of side arms 82 provided with outwardly extending ears 83, forming suitable finger tabs for manipulating the same, and a transversely extending cross-bar 84 which serves to engage and hold down the end flaps 49 of the boxes 48 during the filling operation. The side arms 82 are provided with projections 86 adapted to engage frictionally an indentation 88 on the side arms 52 of the frame structure 50. In this manner the frame structure 50 and the frame structure 80 may be locked together and moved as a single unit, or separately, as desired. A lug 89 is formed adjacent the rear of each of the side arms 82 for providing means for engaging an associated pivotal frame member 90 hereinafter described.

The associated pivotal frame member 90 consists of a transversely extending cross-bar 92 connected by side arms 93 pivotally mounted on the shaft 51 of the rear supporting legs 34. The bar 92 is adapted to be positioned below the forward ends of the boxes 48 and behind their downwardly projecting open-end flaps 49. It will be apparent that when the frame member 80 is raised upwardly, removing its cross-bar 84 from the end flaps 49 of the boxes 48, thereby releasing the same, the lugs 89 engage the side arms 93 of the frame member 90 and carries it upwardly, causing its cross-bar 92 to force upwardly the depending end flaps 49 to a position whereby they may be easily and quickly slipped manually into their respective boxes 48 to close the same.

Stripping means 100 is provided for automatically removing the spurs 20 from their respective confectionery products 25. This means consists of a pair of forwardly projecting horizontal arms 102 pivotally mounted on a shaft 104 journalled in the rear supporting legs 34. A housing 106 is mounted transversely of the arms 102 adjacent the forward ends thereof, and adapted to act as a guide track for a pair of spaced transversely slidable arms 108, which are pivotally connected to a common lever 112. A projecting finger 116 is provided adjacent the top and outside end of each arm 108, which fingers 116 are adapted to engage the handles 22 of the spur plate 12, as best shown in Fig. 5. Spring tensioning means 118 connects the arms 102 from a point 103 spaced from the legs 34 to a fastening lug 120, and provides means for maintaining normally the stripping means 100 in its uppermost position. The lever 112 is connected, as indicated at 122, to a link 124, which in turn is connected as at 126, to a foot treadle operated lever 128, fulcrumed at its rear end to the floor by means of a bifurcated plate member 130. The forward end of the lever 128 is provided with a foot pad 132.

In operation of the stripping means 100, it will be apparent that when pressure is applied downwardly on the foot pad 132 by the foot of the operator, the lever 128 pulls its connecting link 124 downwardly, causing the projecting fingers 116 to be moved beyond the handles 22 of the spur plate 12. Further downward movement of the lever 112 pulls the housing 106 and its pivotal supporting arms 102 downwardly against the spring tensioning means 118. This further downward movement causes the fingers 116 to exert pressure downwardly on the handles 22, withdrawing the spurs downwardly through the stripping plate 13. As the spurs 20 are withdrawn through the apertures 19 of the stripping plate 13, it exerts pressure against the bottom side of the confectionery products 25, forcing them from their respective spurs.

In harvesting and packaging the completed frozen confectionery products 25, it is to be assumed that the tray 44 has been loaded with boxes 48 and positioned in the depression of the elevated platform 43, with the open-ended flaps 49 secured under the cross-bar 84, and that the frame members 50 and 60 are properly positioned horizontally.

The portable spur plate 12, which is best shown in Fig. 2, is inverted with the handles 15 mounted in the channels 42 of the arms 41, as best shown in Fig. 5, with the confectionery products 25 uppermost. Releasing of the confectionery products 25 from their respective spurs 20 may be accomplished by depressing the foot pad 132, which as heretofore described, moves the fingers 116 over the handles 22 of the spur plate 12, withdrawing the spurs 20 through the top plate 13, forcing the confectionery products 25 therefrom and depositing them on the top side thereof. Withdrawal of the spurs 20 from the confectionery products 25 leaves a small aperture 135 extending into the product, as best shown in Figs. 5 and 6. Thereupon, the slidable member 60 is ready to be moved backwardly of the frame member 60, causing the side 67 of the pusher fingers 66 to engage the nearest confectionery product 25 and force all of the confections 25 of its respective row longitudinally into its aligned box, the guides 54 preventing the confectionery products of a row from getting out of alignment with its respective box and the flexible strip member 72 preventing the products of a row from overriding one another, thereby jamming up in the passageway 55 and slowing up production as well as causing damage to some of the products.

The confectionery products 25 which are made generally in the trade have a hard outer protective coating, such as chocolate, butterscotch and like coatings. These coatings are applied by dipping the confections 25 while mounted on the spurs 20 in a tank of molten flavoring material (not shown). Small drops of such coating materials have a tendency to accumulate around the spurs 20, which provide an uneven surface for sliding into the boxes 48 and which causes the confections to have a tendency to override one another when the apparatus is being operated quickly. The flexible strip members 72 prevent overriding, and also prevent the confectionery products 25 from jumping out of their respective passageways 55 when the spurs 20 are withdrawn with a jerk or uneven pressure due to careless or violent operation of the foot treadle 132. Elimination of these tendencies has greatly increased the efficiency and production of the machine.

The foot treadle 132 may then be released, and the frame members 50 and 60 moved to their vertical position as a unit, as best shown in Fig. 1. This releases the end flaps 49 of the boxes 48. When the member 80 approaches the end of its movement vertically, the lugs 89 engage the arms 93 of the associated frame member 90, moving its front cross-bar 92 upwardly. This upward movement of the cross-bar 92 brings the end flaps 49 of the boxes 48 into position for easy manual closing. The tray 44 may now be removed from its depressed centering platform 43, and its contents packed in cartons for shipping.

Although I have only described in detail one form which the invention may assume, it will be apparent to those skilled in the art that the invention is not so limited, but that various modifications may be made therein without departing from the spirit thereof or from the scope of the appended claims.

What I claim is:

1. Apparatus for harvesting and packaging a plurality of frozen confectionery units which comprises means for supporting a plurality of individual boxes in a single plane, means for receiving a portable carrier in juxtaposition to said aligned boxes having a plurality of spaced rows of spaced confectionery units bonded thereto whereby each row is aligned with one of said boxes, means for actuating the carrier to release the confectionery units therefrom, means for guiding each row of released units longitudinally into said boxes, means for preventing the units of each row from overriding one another while being moved into said boxes, and means for moving simultaneously the confectionery units of each row from said carrier into its aligned box.

2. Apparatus for harvesting and packaging a plurality of frozen confectionery units which comprises means for supporting a plurality of individual boxes in a single horizontal plane, means for receiving a portable carrier in juxtaposition to said aligned boxes having a plurality of spaced rows of spaced confectionery units bonded thereto whereby each row is aligned with one of said boxes, means for actuating the carrier to release the confectionery units therefrom, means for guiding each row of confectionery units from said carrier into its aligned box, means for maintaining each row of confectionery units in the same horizontal plane as said boxes, and means for moving simultaneously the confectionery units of each row from said carrier into its aligned box.

3. Apparatus for harvesting and packaging a plurality of frozen confectionery units which comprises means for supporting a plurality of individual boxes in a single horizontal plane, means for receiving a portable carrier in juxtaposition to said aligned boxes having a plurality of spaced rows of spaced confectionery units bonded thereto whereby each row is aligned with one of said boxes, means for actuating the carrier to release the confectionery units therefrom, means for guiding each row of released units longitudinally into its respective box, flexible means for maintaining said units in a horizontal plane while being released and moved into said boxes, and means for moving simultaneously the confectionery units of each row from said carrier to its aligned box.

THELMA EVELYN MARY HUTH.